United States Patent [19]
Humphrey

[11] 3,912,298
[45] Oct. 14, 1975

[54] FOLDABLE STEPS FOR MOBILE HOME

[76] Inventor: William D. Humphrey, 2473 Sunrise Blvd., Rancho Cordova, Calif. 95670

[22] Filed: Jan. 10, 1975

[21] Appl. No.: 540,213

[52] U.S. Cl. ................................ 280/166; 182/115
[51] Int. Cl.² .......................................... B60R 3/02
[58] Field of Search ............ 280/166; 182/115, 152, 182/156, 95; 52/182, 184, 64

[56] References Cited
UNITED STATES PATENTS

| | | | |
|---|---|---|---|
| 3,462,170 | 8/1969 | Smith | 280/166 |
| 3,693,754 | 9/1972 | Butler | 182/115 |
| 3,807,757 | 4/1974 | Carpenter | 280/166 |
| 3,808,757 | 5/1974 | Greenwood | 182/115 |

*Primary Examiner*—Robert R. Song
*Attorney, Agent, or Firm*—Lothrop & West

[57] ABSTRACT

Installed at a door of a mobile home is a platform with protective side rails; and leading from platform to ground level are steps with protective balustrades. Platform, rails, steps and balustrades are foldable into compact form against the side of the mobile home.

6 Claims, 5 Drawing Figures

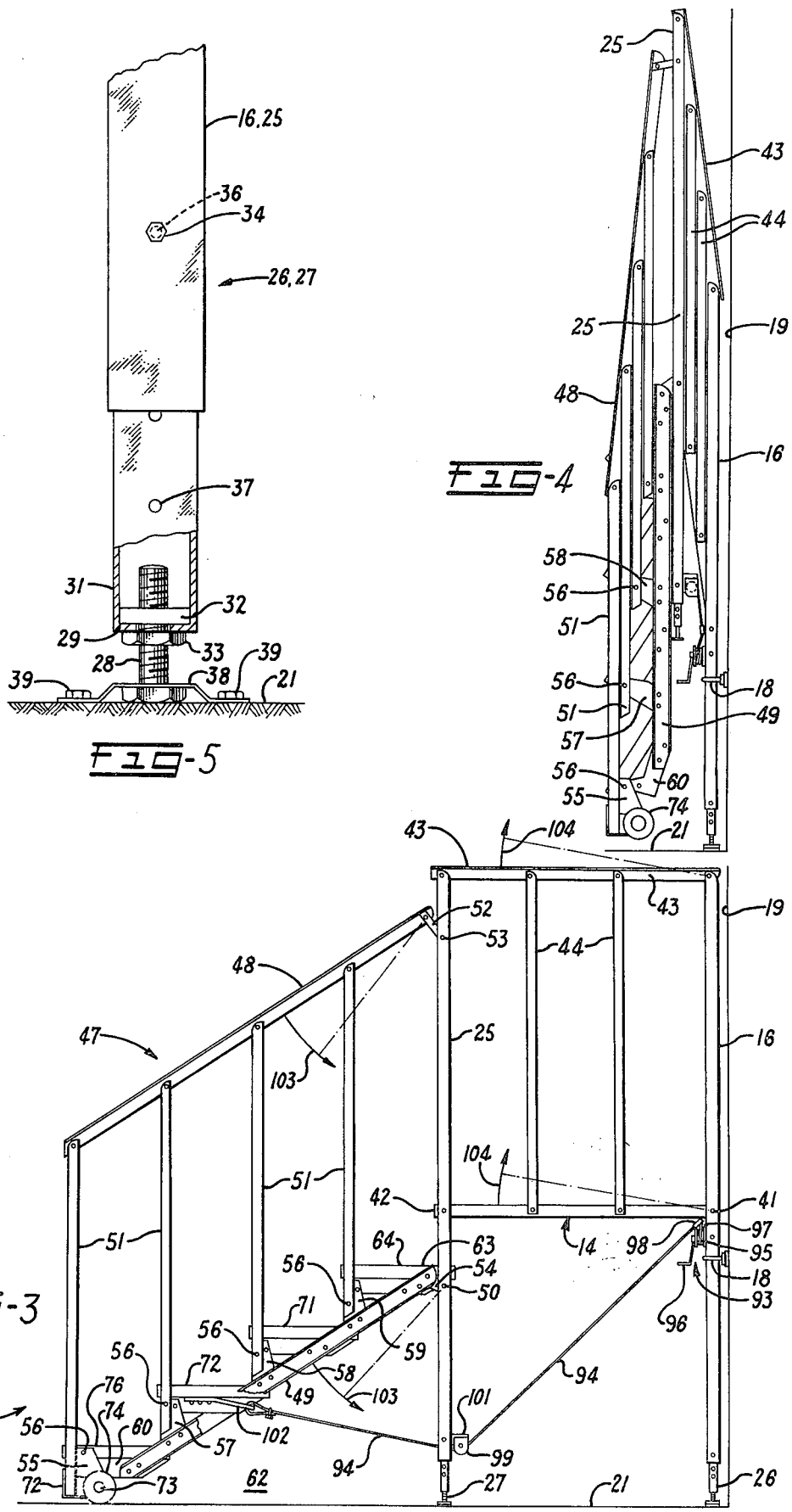

FOLDABLE STEPS FOR MOBILE HOME

BACKGROUND OF THE INVENTION

Neither the market place nor the patent literature lacks representative foldable steps for use in fire escapes or on vehicles, campers and the like. Exemplary is the disclosure in Smith et al U.S. Pat. No. 3,462,170 dated Aug. 19, 1969.

However, a unique problem is posed in mobile home parks where, as is customary, the back door of the mobile home opens onto an elongated side passageway, or driveway, in which the occupant's vehicle is ordinarily parked. In many instances, a boat with trailer, pickup truck with camper or a second car must also be parked in the limited space available in the passageway, in which case freedom of ingress and egress is required for the entire length of the passageway. This requirement is in conflict with the need for a stairway from the door to ground level since a stairway must necessarily intrude upon the available space. Further, the back door of many mobile homes is located at about midway in the passageway, with the result that a permanent stairway isolates the back portion of the passageway remote from the entrance and thus prevents full use of the passageway for vehicular parking.

SUMMARY OF THE INVENTION

It is therefore an object of the invention to provide foldable steps which can be used in many environments, but which afford a particularly advantageous result when installed at a door located adjacent the passageway of a mobile home owing to the fact that the steps fold flat to a thickness of only 12 to 13 inches, thereby enabling two vehicles to park in one driveway.

It is another object of the invention to provide foldable steps including a platform which can readily and conveniently be adjusted as to height and in which the treads can be individually leveled.

It is still another object of the invention to provide foldable steps for a mobile home door in which the door is automatically prevented from opening outwardly, and the doorway is barred, when the steps are in folded position, thereby preventing a person from inadvertently stepping off the door sill when the steps are not in extended position.

It is a further object of the invention to provide foldable steps which can be quickly folded and unfolded with but a minimum of effort.

It is yet another object of the invention to provide foldable steps for mobile home which, in extended mode, are stable, safe and secure yet which, in folded mode, are compact in overall configuration and protrude only a few inches into the passageway, thereby affording vehicular access to the entire length.

It is a further object of the invention to provide foldable steps which are relatively economical to make and install yet are durable and long-lived.

It is another object of the invention to provide generally improved foldable steps for especial use with mobile homes.

Other objects, together with the foregoing, are attained in the embodiment described in the following description and shown in the accompanying drawings, in which:

FIG. 3 is a side elevational view of the steps in unfolded position;

FIG. 4 is a side elevational view of the steps in folded position; and

FIG. 5 is a fragmentary view, to an enlarged scale of the platform height adjuster and leveler.

DESCRIPTION OF PREFERRED EMBODIMENT

Figure 1:
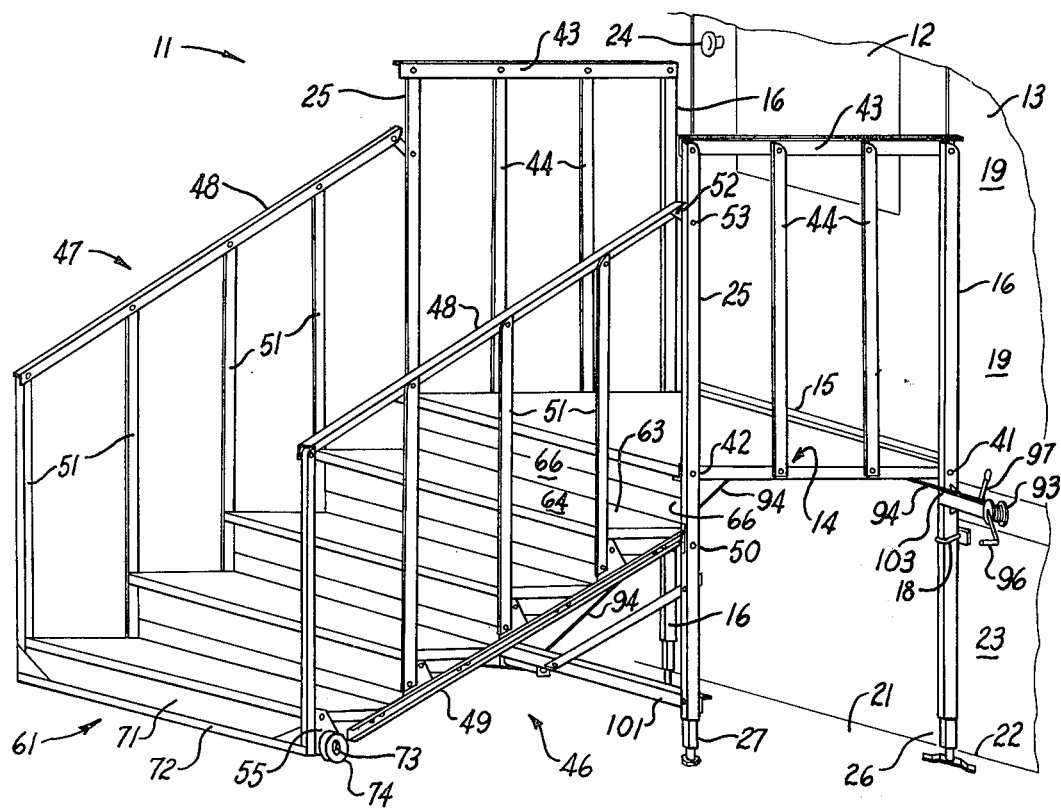
FIG. 1 is an isometric view showing the steps in unfolded position.

While the foldable steps of the invention are susceptible of many different physical embodiments, depending upon the environment and requirements of use, numerous of the herein shown and described embodiment have been made and used and all have performed in an entirely satisfactory manner.

The foldable steps of the invention, generally designated by the reference numeral 11 are customarily installed at the doorway 12 of a mobile home coach 13. Supporting the inner end of a horizontal rectangular platform 14, or landing, located adjacent and slightly below the level of the door's threshold 15 are two vertical fixed stanchions 16 secured as by U-bolt fastenings 18 the adjacent longitudinal frame channel located behind the siding 19 of the coach. The fixed stanchions 16 are supported on the ground 21 near the bottom edge 22 of the customary decorative and protective skirt 23 spanning the distance between the ground and the bottom of the coach siding 19; and the fixed stanchions 16 extend upwardly to approximately the height of the doorknob 24. In many instances the ground surface would be a layer of asphalt paving or concrete.

Spaced outwardly from and in parallel relation to the two fixed stanchions 16 are two movable stanchions 25 serving to support the outer end of the platform 14 in pivotable relation.

In order to position the platform at the proper elevation relative to the threshold 15, the bottoms of the four stanchions are provided with platform height adjusters. Two height adjusters 26 are located on the bottom of the fixed stanchions 16; two height adjusters 27, on the movable stanchions 25. The four height adjusters are substantially identical except for the differences which will be noted; and a description of one will therefore serve to describe all four.

As appears most clearly in FIG. 5, each of the height adjusters includes an inverted bolt 28 extending upwardly through an opening in a horizontal plate 29 welded to the bottom of a hollow, square-in-section sleeve 31 which telescopes in the bottom of the square-in-section stanchion. A square nut 32 welded to the upper surface of the plate 29 is threadably engaged by the bolt 28 and a locking nut 33 in engagement with the bolt serves to lock the bolt in place when platform positioning and leveling is completed.

Gross adjustment is accomplished by moving the sleeve 31 up or down relative to the respective stanchion and securing the two members by a cross bolt 34 extending through an opening 36 in the stanchions and through the registering one of a plurality of openings 37 in the sleeve 31.

After gross height adjustment is effected, fine adjustment and ultimate leveling are accomplished by threading the bolt 28 up or down, followed by securing the lock nut 33.

Each of the adjusters 26 at the lower ends of the fixed stanchions 16 also includes a hold-down fitting 38 comprising an offset bracket having openings on the two ears to receive suitable fasteners 39, such as lag screws capable of securing the lower ends of the fixed stanchions to the supporting pad of asphalt, or the like.

The inner end corners of the platform 14 are pivotally mounted on the respective fixed stanchions 16, as by pins 41, and the outer end corners of the platform 14 are similarly pivotally mounted, on pins 42.

In the interests of security and rigidity, each of the upper ends of the movable stanchions is connected to the upper end of the adjacent one of the fixed stanchions by a hand support bar 43, or guard rail. The bars 43 are pivotally mounted on the stanchions so that when the outer end of the platform 14 is swung upwardly and inwardly about the pins 41 as a pivot, the movable stanchions 25 and the pivotally attached hand support bars 43 also swing upwardly, as appears most clearly in FIGS. 3 and 4.

Preferably, for still further security, a pair of balusters 44 on each side of the platform is pivotally mounted at both ends on the respective hand support bars 43 and subjacent platform side edges. As will be apparent, the vertical balusters 44 swing upwardly in parallel motion with the vertical movable stanchions 25 when folding of the steps occurs.

When in unfolded, or extended, position, gravity holds the pivoted platform bar and baluster members rigidly and securely in place.

Connecting the platform 14 and the ground 21 is a flight of steps 46 including a pair of balustrades 47 each comprising a top rail 48, a bottom rail 49 and a plurality of vertical balusters 51.

The components of the balustrades, platform guards, stanchions and the like, are, for the most part, standard structural shapes, such as angle-iron, channels, bars and straps. Consequently, no detailed explanation of the individual structural members is deemed necessary.

Each of the top rails 48 includes a fixed projecting strap 52 mounted by a pin 53 on the movable stanchion 25 and comparable straps 54 on the bottom rails 49 are pivotally mounted on the movable stanchions 25 by pins 50. Likewise, the upper three balusters 51 are pivotally mounted by pins 56 on gussets 57, 58 and 59 secured to the bottom rails (see FIGS. 3 and 4) so that, as previously described in connection with the guard rails 43 and balusters 44, both balustrades 47 swing upwardly when the structure is moved into compactly folded configuration. A gussett 55 on the bottom end of the outermost one of the balusters 51 is pivotally mounted by pin 56 to a bracket 60 on the lower end of the bottom rail 49.

Spanning the bottom of the two balustrades 47 is a plurality of steps 61 mounted between the bottom rails 49, as will now be described, so that they also partake of the compact folding action which occurs when the device is withdrawn, or retracted, from the passageway 62 into which it projects when being used as a combined platform and stairway.

As appears most clearly in FIGS. 1 and 2, each of the steps 63 includes a tread 64, with the top tread located at a suitable elevation below the platform 14, this distance determining the height of the corresponding riser 66. The ends of each of the treads 64 are mounted on a pair of inverted L-shaped brackets 67. The horizontal tops 68 of the brackets are secured by screw fastenings to the bottom of the tread. The vertical side plates 69 of the brackets 67, which are in the form of truncated triangles, are mounted on the bottom rail 49 and not only add rigidity and strength to the steps but also assist in the leveling of the tread, as will now be described.

The intermediate steps are substantially similar to the top step as is the bottom step except for the slightly different construction of the bottom riser, which extends transversely between the lower ends of the bottom balusters, and the presence of the transverse angle-iron stiffener 72 welded to the bottoms of the two outermost balusters for greater rigidity.

The pair of gussets 55 mounted on the lower ends of the two outermost balusters 51 carries a transverse axle 73 on which is mounted, on antifriction bearings, a pair of wheels 74 serving to support the stairway when in extended position and during folding and unfolding of the steps. The wheels also facilitate limited to and fro movement of the structure in response to temperature variations, structural flexures, and the like.

Figure 2:
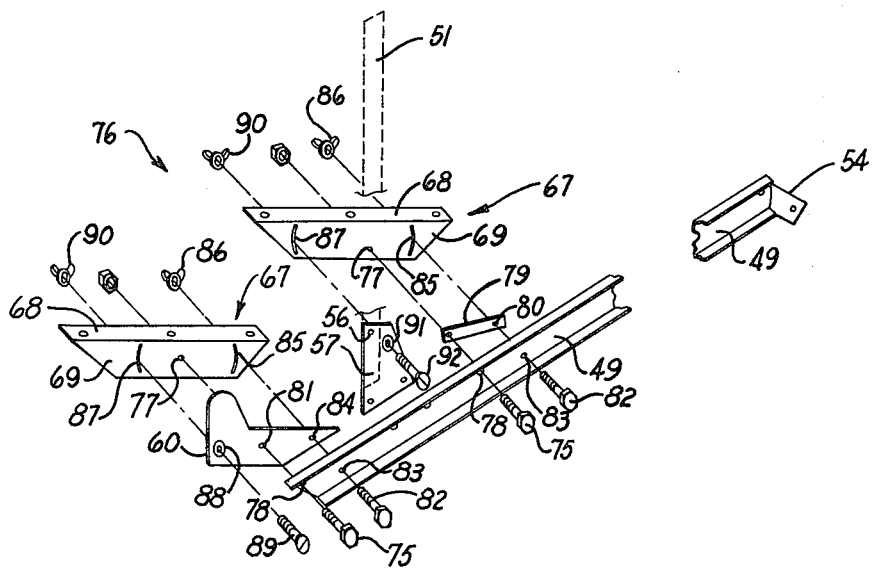
FIG. 2 is a fragmentary, exploded, isometric view of the tread leveling structure.

One of the unique features of the present invention is the provision of a tread leveler, generally designated by the reference numeral 76 and illustrated most clearly in FIG. 2, which also shows the mounting relation of the treads, the bottom rail 49 and the balusters 51.

The tread leveler 76 is put into use after the platform 14 has been adjusted to the desired height relative to the threshold 15 by means of the platform height adjusters 26 and 27, as previously described.

Formed near the center of the vertical plate 69 of each of the L-shaped tread support and leveling brackets 67 is an opening 77. When each of the treads is being installed on the bottom rail 49, the central opening 77 is first aligned with a respective opening 78 in the bottom rail 49. Preferably, a bolt fastening 75 is then used to secure the L-shaped bracket 67 to the bottom rail 49, a spacer 79 being interposed in the case of all treads except the bottom tread where the bracket 60 is interposed between the tread support bracket 67 and the bottom rail 49 when assembly takes place.

The bracket 60 is itself secured to the adjacent lowermost end of the bottom rail 49 not only by the fastening 75, or fulcrum pin, which passes through the openings 77 and 78, and registering opening 81 in the interposed bracket 60, but also by a bolt 82. The bolt 82 passes through an opening 83 in the bottom rail, an opening 84, in the bracket 60, thence through a first arcuate slot 85 in the tread support bracket 67 for engagement with a first wing nut 86 on the nether side of the bracket 67.

A second arcuate slot 87 is formed in the tread bracket 67 on the end opposite the first arcuate slot 85; and a countersunk opening 88 is provided in the bracket 67. A flat head machine screw 89 is inserted through the opening 88, with the head flush, the screw 89 passing through the arcuate slot 87 and into engagement with a second wing nut 90 behind the tread support bracket 67.

As can be seen, by loosening the wing nuts 86 and 90, the step tread can be tilted about the central bolt 75 as a pivot, or fulcrum, until the top of the tread is level. The wing nuts 86 and 90 are then tightened, thereby securing the tread in level position so that thereafter as folding and unfolding occurs, the step treads return to horizontal attitude.

In similar manner, the three higher treads are leveled, a countersunk opening 91 in the gusset 57 receiving a flat head machine screw 92 which passes through the second arcuate opening 87 and respective second wing nut 90. The machine screw 82 passes through opening 83, opening 80 in the spacer 79, first arcuate slot 85 in the bracket 67 and into engagement with wing nut 86.

The gusset 57 is connected to the bottom rail by a pair of pop rivets, for example, passing through a pair of registering openings in the bottom rail and the gusset 57, as shown in FIG. 2.

Folding of the steps is effected by a winch 93 and cable 94. In the embodiment disclosed herein, the winch 93 is appropriately mounted on the right rear fixed stanchion, the winch including a reel 95 with crank handle 96 and conventional ratchet lock lever 97 which enables the user to crank in the steps by hand from the first, unfolded position shown in FIGS. 1 and 3 to the second, folded, position illustrated in FIG. 4, and then to set the lock lever 97 in order securely to retain the steps in the second, upright or folded position.

The cable 94 leads from the reel 95 to a turn pulley 98 located approximately midway between the two fixed stanchions 16, thence downwardly and outwardly to a guide pulley 99 mounted on an angle iron cross brace 101 and to a cable anchor 102 mounted on the bottom of the tread of the next to lowest step (see FIG. 3).

The ratchet lever 97 serves to lock the foldable steps both in folded and unfolded position, an indicium 103 such as a ring of white paint on the cable 94, providing a guide so that when the painted ring is in register with the center of the right rear fixed stanchion (see FIG. 1) the steps are in properly extended condition. In this manner, the steps can readily be unfolded to the same position each time, thus assuring that the treads after initial leveling, as heretofore described, will always return to horizontal attitude.

Although not shown, it can be seen that the winch could be mechanized, or motorized, in which case suitable limit switches can be utilized to position the steps in their extreme positions; and an appropriate switch can be mounted on the siding of the coach, adjacent the doorknob 24, for example, as well as inside the coach, so as to afford ready and convenient control over the two modes effected by the foldable steps of the invention.

In operation, should it be desired to fold the steps from the position shown in FIGS. 1 and 3 to the position shown in FIG. 4, the winch reel is rotated so that the cable 94 urges the cable anchor 102 toward the right (see FIG. 3), this force, in turn being transmitted through the tread to the bottom rails 49 and causing the lower rails to swing downwardly about the pins 50, as a pivot axis, in a counterclockwise direction, as indicated by the arrow 103. The downward component of the force, acting on the wheels 74, causes the movable stanchions 25 to rise by the reactive effort exerted through the rails 48 and 49 and respective pivot pins 53 and 50.

As the movable stanchions 25 begin to elevate, the guard rails 43 and the platform 14 are swung in the clockwise direction indicated by the directional arrows 104.

As folding proceeds, the supportive wheels 74 roll over the smooth surface of the grade 21; and substantially the only force that must be overcome by the winch is that required to lift the movable stanchions, the movable members connected to the movable stanchions and the frictional resistance of the pivot members. Upon approaching fully upright position (see FIG. 4) almost the entire weight is borne by the fixed stanchions 16; and, if desired, the components can be dimensioned so that as fully folded position is neared, the wheels 74 will be lifted slightly above ground level 21, as appears in FIG. 4. When the steps are fully folded, the ratchet 97 is locked.

In order to unfold the steps, the foregoing procedure is reversed.

It can therefore be seen that the problem heretofore existing, particularly in the case of a mobile home driveway onto which a back door opens, has been solved by foldable steps which provide a stable platform and rigid treads when in extended position, yet which can be expeditiously folded and unfolded with a minimum of effort.

What is claimed is:

1. In combination with a mobile home having a door with a threshold at a predetermined height above ground level, foldable steps comprising:
    a. a pair of fixed vertical stanchions adjacent the side edges of the door;
    b. a pair of movable stanchions located outwardly from and parallel to said fixed stanchions;
    c. a rectangular platform pivotally mounted adjacent its inner corners to said fixed stanchions and pivotally mounted adjacent its outer corners to said movable stanchions, said platform being swingable with said movable stanchions between a first position wherein said platform is substantially horizontal and said movable stanchions are outwardly spaced from said fixed stanchions and a second position in which said platform is inclined forwardly and upwardly and said movable stanchions are in close juxtaposition to said fixed stanchions;
    d. a pair of top rails pivotally mounted on said movable stanchions adjacent the upper ends of said movable stanchions, said top rails extending forwardly and downwardly from said movable stanchions;
    e. a pair of bottom rails pivotally mounted on said movable stanchions said bottom rails being located below and parallel to said top rails;
    f. a plurality of balusters vertically spanning said top rails and said bottom rails and being pivotally mounted thereon to form therewith a pair of balustrades movable between a primary extended position wherein said balustrades project forwardly and downwardly from said movable stanchions into supported relation on the ground and a secondary retracted position in which said balustrades are withdrawn into close juxtaposition to said movable stanchions;
    g. a plurality of stair treads extending between and mounted on said balustrades for movement therewith as said platform and said movable stanchions are moved between said first position and said second position and said balustrades are moved between said primary extended position and said secondary retracted position; and
    h. winch means for folding said platform, said movable stanchions, said balustrades and said steps.

2. Foldable steps as in claim 1 wherein said fixed stanchions and said movable stanchions are substantially equal in height and when in said first position extend upwardly from the ground to approximately the height of the knob of said door; a pair of hand support bars pivotally mounted on and spanning the respective upper ends of said fixed stanchions and said movable stanchions; and, a plurality of vertical guard posts pivotally mounted on and spanning said hand support bars and the sides of said platform.

3. Foldable steps as in claim 2 wherein said winch means includes a drum, a cable on said drum extending to a bottom central location on one of said treads; and means for selectively actuating said drum to retract and release said cable to effect corresponding movement of said steps.

4. Foldable steps as in claim 3 further including means carried on the lower ends of said fixed stanchions and said movable stanchions for adjusting the heights thereof.

5. Foldable steps as in claim 4 including roller means mounted on the lower forward ends of said balustrades for rolling engagement with the ground when said steps are in unfolded position.

6. Foldable steps as in claim 1 including adjustable means connecting said stair treads and said bottom rails for leveling said stair treads when said pair of balustrades is in said primary extended position.

* * * * *